United States Patent
Glejbol

(10) Patent No.: US 9,482,372 B2
(45) Date of Patent: Nov. 1, 2016

(54) FLEXIBLE UNBONDED PIPE

(75) Inventor: Kristian Glejbol, Glostrup (DK)

(73) Assignee: NATIONAL OILWELL VARCO DENMARK I/S, Brondby (DK)

(*) Notice: Subject to any disclaimer, the term of this patent is extended or adjusted under 35 U.S.C. 154(b) by 270 days.

(21) Appl. No.: 14/116,448

(22) PCT Filed: May 8, 2012

(86) PCT No.: PCT/DK2012/050152
§ 371 (c)(1),
(2), (4) Date: Dec. 2, 2013

(87) PCT Pub. No.: WO2012/152282
PCT Pub. Date: Nov. 15, 2012

(65) Prior Publication Data
US 2014/0076450 A1    Mar. 20, 2014

(30) Foreign Application Priority Data

May 10, 2011 (DK) .................................. 2011 00360
May 11, 2011 (DK) .................................. 2011 00365

(51) Int. Cl.
*F16L 11/00* (2006.01)
*F16L 11/08* (2006.01)
(Continued)

(52) U.S. Cl.
CPC ............ *F16L 11/082* (2013.01); *E21B 17/015* (2013.01); *F16L 11/083* (2013.01); *F16L 11/18* (2013.01)

(58) Field of Classification Search
CPC ................................ F16L 11/082; F16L 11/18
USPC ........................................ 138/118.1, 137, 130
See application file for complete search history.

(56) References Cited

U.S. PATENT DOCUMENTS 4,431,034 A   2/1984   Abdullaev
4,867,205 A   9/1989   Bournazel
(Continued)

FOREIGN PATENT DOCUMENTS

WO   00/70256 A1   11/2000
WO   01/51839 A1   7/2001
(Continued)

OTHER PUBLICATIONS

"Rexommended Practice for Flexible Pipe" ANSI/API Recommended Practice 17B Fourth Edition, Jul. 2008.
(Continued)

*Primary Examiner* — Paul R Durand
*Assistant Examiner* — Vishal Pancholi
(74) *Attorney, Agent, or Firm* — Pearne & Gordon LLP

(57) ABSTRACT

The invention relates to a flexible unbonded pipe for sub sea fluid transfer. The pipe comprises an inner sealing sheath defining a bore and a center axis. Inside the inner sealing sheath the pipe comprises a carcass. The pipe further comprises a pair of reinforcement layers consisting essentially of helically wound elongate armoring elements of fiber reinforced polymer material. The elongate armoring elements of the innermost of the pair of reinforcement layers are wound in a first winding direction with an angle $\alpha$ to the center axis, and the elongate armoring elements of the outermost of the pair of reinforcement layers are wound in a second winding direction with an angle $\beta$ to the center axis, wherein $\alpha \geq \beta f \pi / 2$, $\alpha$ is about 65° or less. The pipe preferably comprises an anti-creep layer placed between the inner sealing sheath and the innermost of the pair of reinforcement layers.

22 Claims, 5 Drawing Sheets

(51) Int. Cl.
 *E21B 17/01* (2006.01)
 *F16L 11/18* (2006.01)

(56) References Cited

U.S. PATENT DOCUMENTS

| | | |
|---|---|---|
| 5,110,644 A | 5/1992 | Sparks |
| 5,176,179 A * | 1/1993 | Bournazel .............. F16L 11/112 138/130 |
| 6,065,501 A | 5/2000 | Feret |
| 6,085,798 A | 7/2000 | Le Nouveau |
| 6,085,799 A | 7/2000 | Kodaissi |
| 6,123,114 A | 9/2000 | Seguin |
| 6,165,586 A | 12/2000 | Nouveau |
| 6,415,825 B1 | 7/2002 | Dupoiron |
| 6,620,471 B1 | 9/2003 | Do |
| 6,872,343 B2 | 3/2005 | Edwards |
| 7,024,941 B2 | 4/2006 | Andersen |
| 2003/0070719 A1 | 4/2003 | Espinasse |
| 2004/0175523 A1 | 9/2004 | Gerez |
| 2006/0191587 A1 | 8/2006 | Gerez |
| 2008/0283138 A1* | 11/2008 | Rytter .................. F16L 11/083 138/133 |
| 2010/0089478 A1* | 4/2010 | Gudme ................. F16L 11/083 138/104 |
| 2010/0101675 A1 | 4/2010 | Do |
| 2010/0146768 A1 | 6/2010 | Sheldrake |

FOREIGN PATENT DOCUMENTS

| | | |
|---|---|---|
| WO | 01/61232 A1 | 8/2001 |
| WO | 2006/005689 A1 | 1/2006 |
| WO | 2008/077409 A1 | 7/2008 |
| WO | 2008/077410 A1 | 7/2008 |
| WO | 2009/106078 A1 | 9/2009 |
| WO | 2011/042023 A1 | 4/2011 |
| WO | 2011/050810 A1 | 5/2011 |
| WO | 2011/120525 A1 | 10/2011 |
| WO | 2012/076017 A1 | 6/2012 |
| WO | 2012/146244 A1 | 11/2012 |
| WO | 2012/149937 A1 | 11/2012 |

OTHER PUBLICATIONS

"Specification for Unbonded Flexible Pipe" ANSI/API Specification 17J Third Edition, Jul. 2008.
European Office action for 12 781 927.4 dated Apr. 26, 2016.

* cited by examiner

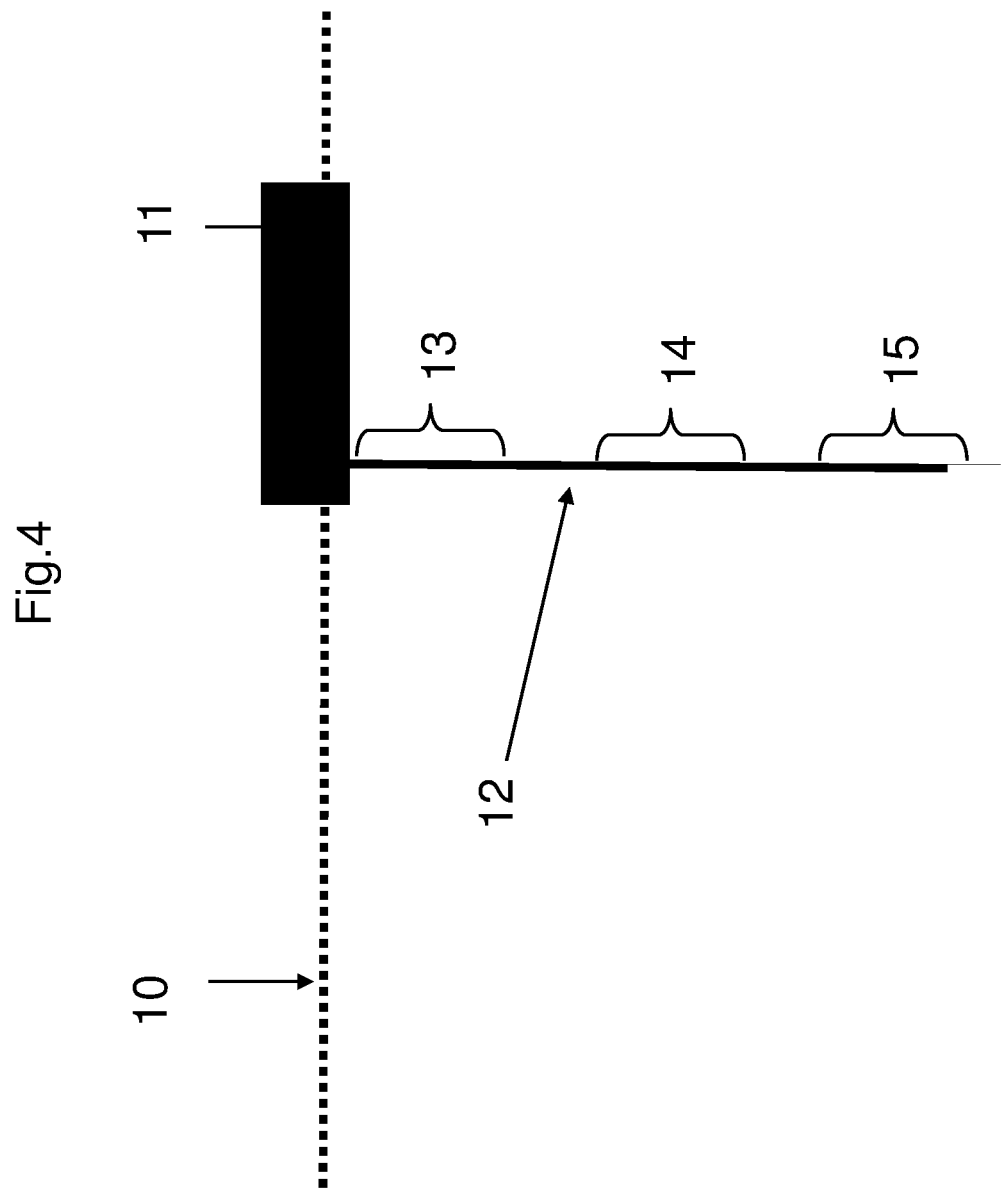

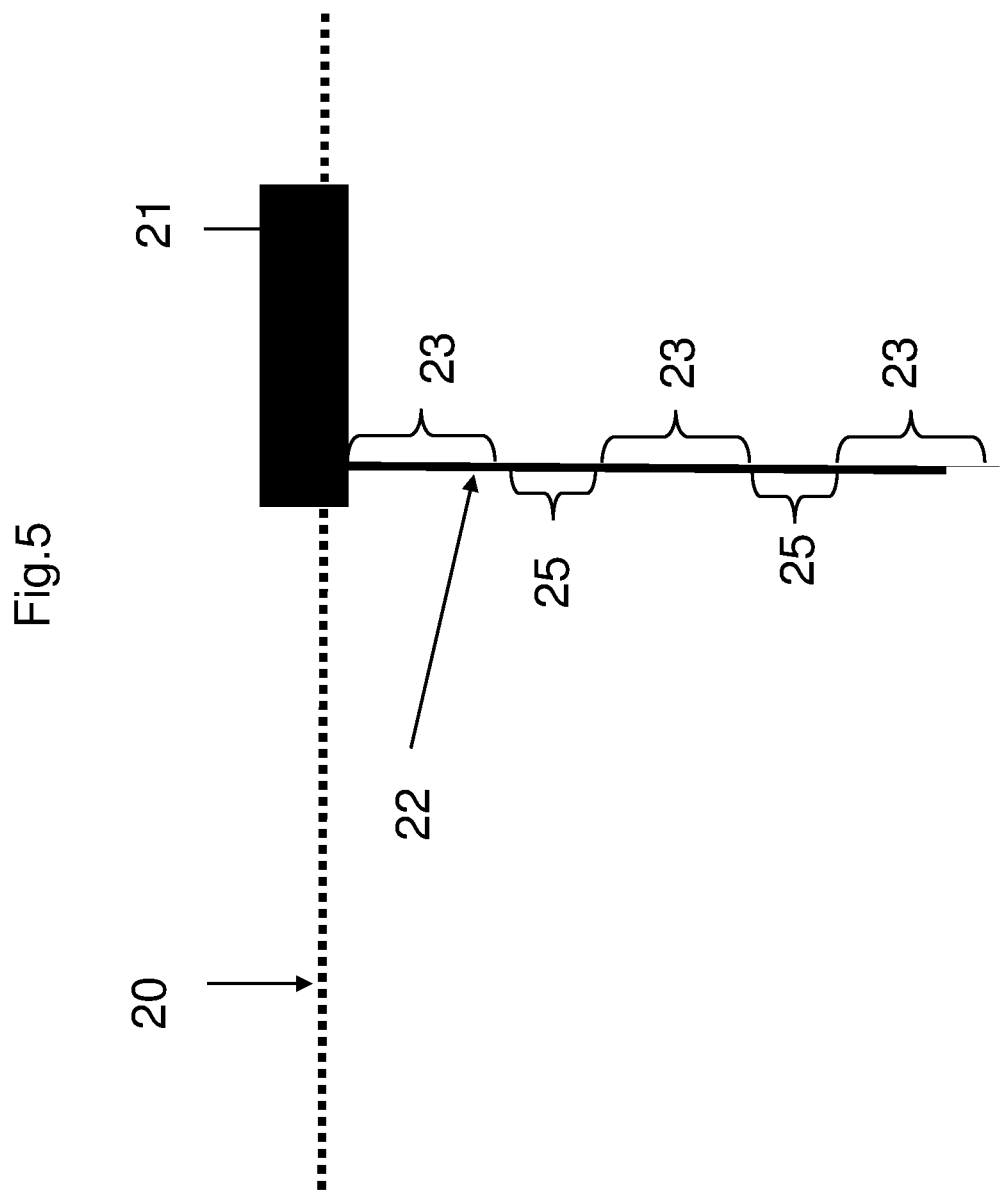

FLEXIBLE UNBONDED PIPE

TECHNICAL FIELD

The present invention concerns a flexible unbonded pipe for sub sea fluid transfer, for example for transporting water or aggressive fluids, such a petrochemical products, e.g. from a production well to a sea surface installation.

BACKGROUND ART

Flexible unbonded pipes of the present type are for example described in the standard "Recommended Practice for Flexible Pipe", ANSI/API 17 B, fourth Edition, July 2008, and the standard "Specification for Ubonded Flexible Pipe", ANSI/API 17J, Third edition, July 2008. Such pipes usually comprise an inner liner also often called an inner sealing sheath or an inner sheath, which forms a barrier against the outflow of the fluid which is conveyed in the bore of the pipe, and one or more armoring layers. In general flexible pipes are expected to have a lifetime of 20 years in operation.

Examples of unbonded flexible pipes are e.g. disclosed in WO0161232A1, U.S. Pat. No. 6,123,114 and U.S. Pat. No. 6,085,799.

The term "unbonded" means in this text that at least two of the layers including the armoring layers and polymer layers are not bonded to each other. In practice the known pipe normally comprises at least two armoring layers located outside the inner sealing sheath and optionally an armor structure located inside the inner sealing sheath normally referred to as a carcass. These armoring layers comprise or consist of multiple elongated armoring elements that are not bonded to each other directly or indirectly via other layers along the pipe. Thereby the pipe becomes bendable and sufficiently flexible to roll up for transportation.

In prior art pipes, these armoring layers are largely torsionally balanced. To ensure sufficient torsional balance, at least two of the armoring layers located outside the inner sealing sheath are counter wounded at approximately the same angle relative to the centre axis of the pipe.

A pipe of the above type will for many applications need to fulfill a number of requirements. First of all the pipe should have a high mechanical strength to withstand the enormous forces it will be subjected to during transportation, deployment and operation. The internal pressure (from inside of the pipe and outwards) and the external pressure (from outside of the pipe) are usually very high and may vary considerably along the length of the pipeline particular when applied at varying water depths. If the internal pressure of the pipe exceeds the load bearing capacity of the armoring elements of the armoring layers located outside the inner sealing sheath the internal pressure will ultimately result in damage of the pipe e.g. by upheaval buckling and/or burst of the flexible pipe. If the pipe resistance against the external pressure is too low, the external pressure may ultimately result in catastrophic failure of one or more of the armoring layers resulting in a subsequent failure of the inner sealing sheath and ultimate failure of the flexible pipe e.g. due to collapse of the inner sealing sheath which acts as the primary barrier against outflow of a fluid transported in the flexible pipe. Simultaneously with such severe mechanical loadings the flexible pipe may be subjected to highly corrosive fluids and chemical resistance may be needed. Furthermore, it is often desired to keep the weight of the pipe relatively low, both in order to reduce transportation and deployment cost but also in order to reduce the risk of damaging the pipe during deployment.

In traditional flexible pipes, the armoring layers often comprise metallic armoring layers including a metal carcass typically wound from preformed or folded stainless steel strips and a number of armoring layers in the form of helically wound profiles or wires, where the individual layers may be wound with different winding angles relative to the pipe axis in order to take up the forces caused by internal and external pressure as well as forces acting at the ends of the pipe and shear forces from the surrounding water.

When subjected to hydrostatic pressure in the sea the carcass of the prior art pipe will usually be designed to be sufficiently strong to withstand the hydrostatic pressure, and the armoring layers in the form of helically wound profiles or wires should be designed to be sufficiently strong to withstand internal pressure and tearing in the length direction of the pipe.

In the prior art it has been suggested to replace one or more of the metallic armoring layers with armoring layers of fibers or fiber reinforced polymer of different structures. U.S. Pat. No. 6,165,586 for example discloses a strip of filamentary rovings sampled with bonding material and retaining means. It is suggested to use such strips to replace one or more metallic armoring layers of an unbonded flexible pipe.

WO 01/51839 discloses a flexible unbonded pipe comprising a tensile reinforcement layer of fiber embedded in a polymeric material.

Several older publications disclose fiber reinforced pipes where all the armoring layers are provided by fibers wound in various winding angles. Examples of such pipes are described in U.S. Pat. No. 5,110,644 and U.S. Pat. No. 4,431,034.

However, these prior art pipes are either very heavy due to metal armoring layers or they are very complicated to produce and/or have a very low burst resistance.

DISCLOSURE OF INVENTION

The object of the invention is to provide a flexible pipe which pipe can be provided with desirable low weight in long length and with a desired strength against bursting of the inner sealing sheath. Furthermore it is an object that the pipe can be manufactured in a cost effective manner.

The present invention provides a novel flexible unbonded pipe that meets this object. The flexible pipe of the invention and embodiments thereof have shown to have a large number of advantages which will be clear from the following description.

An identified but until now unsolved problem relating to prior art fiber reinforced pipes is that virtually any severe mechanical load on such flexible pipe will result in high inter-laminar crushing forces. These inter-laminar crushing forces are also present in steel reinforces pipes but can be safely ignored due to the anisotropic nature of this material. Very different to steel is fiber reinforced materials that often have an extremely orthotropic nature governed by the orientation of reinforcement fibers. A prime example on such an orthotropic material is pultruded epoxy/carbon fiber structures where the strength in the fiber direction can be two magnitudes higher than the strength perpendicular to the fiber direction. According to the invention it has been found that when fiber reinforced polymer is used for reinforcing elements, crushing forces can no longer be ignored and that inter-laminar crushing forces between cross wound layers of elongate elements of fiber reinforced polymer has influence on the ultimate strength of the structure.

The flexible pipe of the invention has shown to have an armor structure with significantly reduced inter-laminar crushing loads compared to prior art pipes, thereby making the armor structure of the pipe of the invention supremely fit for use of fiber reinforced polymers as reinforcement elements.

The flexible pipe of the invention further allows for use of highly weight optimized fiber reinforced polymeric elongate armoring elements. For example in one embodiment the elongate armoring elements are weight optimized to obtain high tensile strength and low weight by providing that a large amount, such as about 50% by volume or more, such as about 75% by volume or more, such as about 90% by volume or more or even essentially all of the fibers are oriented along the length axis of the elongate armoring elements.

The length direction of an elongate armoring element is the direction corresponding to the elongate extension of the elongate armoring element. The length axis of an elongate armoring element is the center axis of the elongate armoring element in its length direction.

Unless other is specified, the tensile strength of an elongate armoring element is determined in the length direction of the elongate armoring element.

Further more it has been found that the pipe of the invention further allows for use of fewer reinforcement layers and/or thinner reinforcement layers retaining the same functionality compared to prior art pipe, hence slashing the production costs significantly.

The flexible unbonded pipe of the invention has accordingly shown to have a surprisingly high burst resistance relative to the thickness and weight of the reinforcement layers of the pipe.

The flexible unbonded pipe of the invention comprises an inner sealing sheath defining a bore and a centre axis. Inside the inner sealing sheath the pipe comprises a carcass, the main purpose of which is to protect the pipe against collapse. The pipe further comprises a pair of reinforcement layers consisting essentially of helically wound elongate armoring elements of fiber reinforced polymer material, wherein the elongate armoring elements of the innermost of the pair of reinforcement layers are wound in a first winding direction with an angle $\alpha$ to the centre axis, the elongate armoring elements of the outermost of the pair of reinforcement layers are wound in a second winding direction with an angle $\beta$ to the centre axis, wherein $\alpha \geq \beta*\pi/2$, $\alpha$ is about 65° or less.

When the pipe is applied at varied depth of water, gravity as well as internal forces will provide a tension in the pipe and/or the pipe can be held in tension by other or additional tensioning elements. Due to the specific selection of winding angles of the pair of reinforcement layers the innermost reinforcement layer will predominantly absorb radial forces while the outermost reinforcement layer predominantly will absorb tensile forces when the pipe is held in tension in use.

Due to the intelligent balanced design of the reinforcement layers of the pipe of the invention the stiffness of the armoring elements as well as the winding angle is matched such that the pipe is largely torsionally balanced when subjected to tension.

In order to reduce the risk of damaging the inner sealing sheath due to high contact forces between the innermost reinforcement layer and the sealing sheath an anti-creep layer can be placed between the inner sealing sheath and the innermost of the pair of reinforcement layers.

Accordingly, in one embodiment an anti-creep layer is placed between the inner sealing sheath and the innermost of the pair of reinforcement layers.

It should be emphasized that the term "comprises/comprising" when used herein is to be interpreted as an open term, i.e. it should be taken to specify the presence of specifically stated feature(s), such as element(s), unit(s), integer(s), step(s) component(s) and combination(s) thereof, but does not preclude the presence or addition of one or more other stated features.

All features of the invention including ranges and preferred ranges can be combined in various ways within the scope of the invention, unless there are specific reasons for not combining such features.

The unbonded flexible pipe of the invention is preferably adapted for use for transportation of water or of aggressive fluids, such a petrochemical products, e.g. from a production well to a sea surface installation.

The flexible unbonded pipe of the invention comprises an inner sealing sheath defining a bore and a centre axis. The inner sealing sheath is the innermost sealing sheath forming a barrier against fluids and which defines the bore through which fluid can be transported. Usually the bore will be substantially circular in cross-section, but it may also have other shapes, such as oval.

Inside the inner sealing sheath the pipe comprises a carcass. The carcass preferably ensures that the pipe can be used where it will be subjected to high hydrostatic forces e.g. for use at deep water. The main function of the carcass is to prevent collapse of the inner sealing sheath.

The inner sealing sheath and the carcass may be any type of inner sealing sheath respectively carcass such as it in known from the prior art and e.g. as described in "Recommended Practice for Flexible Pipe", ANSI/API 17 B, fourth Edition, July 2008, and the standard "Specification for Ubonded Flexible Pipe", ANSI/API 17J, Third edition, July 2008.

The unbonded flexible pipe has a length parallel to its centre axis and a length direction which is a direction parallel to the centre axis.

The pipe further comprises a pair of reinforcement layers consisting essentially of helically wound elongate armoring elements of fiber reinforced polymer material.

The term "consisting essentially of" means that the respective reinforcement layer could comprise intermediate non-armoring element(s) located between the helically wound elongate armoring elements, such as one or more sensors or other elements with no substantially armoring effect compared to the armoring effect of the helically wound elongate armoring elements. Preferably such intermediate non-armoring element(s) if present has each a tensile strength which is about 10% or less, preferably about 5% or less than the tensile strength of an elongate armoring element of the same layer.

The terms "reinforcement layer" and "armoring layer" are used interchangeably.

The pair of reinforcement layers comprises an innermost reinforcement layer which is the innermost of the pair of reinforcement layers and an outermost reinforcement layer which is the outermost of the pair of reinforcement layers.

The elongate armoring elements of the innermost reinforcement layer are wound in a first winding direction with an angle $\alpha$ to the centre axis, and the elongate armoring elements of the outermost reinforcement layer are wound in a second winding direction with an angle $\beta$ to the centre axis.

The first and the second winding direction are cross winding directions and accordingly the pair of reinforcement layers is cross wound.

In the following the winding degrees α and β are expressed as positive values both, although it should be understood that they are determined in opposite directions from the centre axis of the pipe.

The winding degrees α and β are selected such that $\alpha \geq \beta * \pi/2$. Furthermore α is about 65° or less. By selecting the winding degrees of α and β according to the above, the pair of reinforcement layers can simultaneously provide both a high tensile resistance and a high burst resistance.

As mentioned above an anti-creep layer may preferably be arranged between the inner sealing sheath and the innermost reinforcement layer. In one embodiment the anti-creep layer has a tensile strength which is at least about 10 times its collapse strength. In one embodiment the anti-creep layer adds no measurable collapse strength to the pipe beyond the collapse strength provided by the other layers of the pipe. In other words, in this embodiment the collapse strength is not affected by the anti-creep layer.

In the embodiment where an anti-creep layer is placed between the inner sealing sheath and the innermost of the pair of reinforcement layers, the anti-creep layer may in principle be any kind of anti-creep layer such as the anti-creep layer known in the art. Preferably the anti-creep layer is a layer which fully covers the outer surface of the inner sealing sheath such as to reduce the risk of damaging the inner sealing sheath when the innermost of the pair of reinforcement layers is subjected to high pressure from the outermost of the pair of reinforcement layers.

In one embodiment the anti-creep layer substantially covers the inner sealing sheath when the pipe is in a straight and unloaded condition.

In one embodiment the anti-creep layer is selected to be of a material or a material combination which can resist the high pressure subjected on the innermost reinforcement layer by the outermost reinforcement layer, to such a degree that the elongate armoring elements of the innermost reinforcement layer do not fully penetrate the anti-creep layer.

In one embodiment the anti-creep layer is placed in direct contact with the inner sealing sheath. In another embodiment a film layer is wound onto the inner sealing sheath and the anti-creep layer is placed in direct contact with the wound film layer. The film layer may e.g. be an anti wear layer. Such anti wear layers are well known to the skilled person, and may for example be an anti-friction film of PTFE.

The anti-creep layer is preferably a wound layer of one or more wound elements, such a tape(s) and/or fiber(s). In one embodiment the anti-creep layer is a wound layer with a lay angle γ to the centre axis, wherein $\gamma > \alpha$. Preferably $\gamma \geq 55°$, more preferably $\gamma \geq 70°$, such as $90° > \gamma \geq 75°$. The winding direction is in one embodiment similar to the winding direction of the elongate armoring elements of the innermost reinforcement layer, i.e. the first winding direction. In one embodiment the winding direction is the second winding direction.

In one embodiment the anti-creep layer is a wound layer, wound in the second winding direction, preferably with a winding direction of at least about 60°, such as at least about 70°, such as at least about 75°, such as at least about 80°.

In one embodiment the anti-creep layer is a wound layer comprising wound tape. In one embodiment the anti-creep layer consists of at least one wound tape. The tape(s) is preferably wound with overlapping windings. In one embodiment the tape(s) has a thickness of from about 0.05 mm to about 2 mm, preferably from about 0.1 mm to about 1 mm, such as from about 0.2 mm to about 0.8 mm.

In one embodiment the anti-creep layer comprises or consists of one or more substantially continuous fiber elements. The terms "fiber" and "fiber element" are used interchangeably in this text, meaning elements consisting essentially of fiber(s).

The continuous fiber elements are preferably selected from, filaments, strands, or rovings. The phrase "continuous" as used herein in connection with fibers, filaments, strands, yarns or rovings, means that the fibers, filaments, strands, yarns, or rovings generally have a significant length but it should not be understood to mean that the length is perpetual or infinite. The continuous fibers, such as continuous filaments, strands, yarns, or rovings preferably have length of at least about 10 m, preferably at least about 100 m, more preferably at least about 1000 m.

Filaments are continuous single fibers (also called monofilament).

The term "strand" is used to designate an untwisted bundle of filaments.

The term "yarn" is used to designate a twisted bundle of filaments and/or cut fibers.

The term "cut fibers" means herein fibers of non continuous length e.g. in the form of chopped fibers or melt blown fibers. The cut fibers are usually relatively short fibers e.g. less than about 5 cm, such as from about 1 mm to about 3 cm in length. The cut fibers may have equal or different lengths.

Yarn includes threads and ropes. The yarn may be a primary yarn made directly from filaments and/or cut fibers or a secondary yarn made from yarns and/or cords. Secondary yarns are also referred to as cords.

The term "roving" is used to designate an untwisted bundle of strands or yarns. A roving includes a strand of more than two filaments. Accordingly a non twisted bundle of more than two filaments is both a strand and a roving.

The diameter of the fibers is not so important and may for example be between about 5 μm and 25 μm.

In one embodiment the anti-creep layer comprises or consists of one or more substantially continuous filaments, preferably with a thickness of about 10 μm or more, more preferably with a thickness of about 15 μm or more.

To provide a desirable high strength of the anti-creep layer the fiber elements may preferably comprise basalt fibers, aramid fibres, carbon fibers, glass fibers or any mixtures thereof.

In one embodiment the one or more substantially continuous fiber elements each have a modulus of elasticity in their length direction of about 30,000 MPa or more, such as of about 50,000 MPa or more, such as of about 75,000 MPa or more, such as of about 100,000 MPa or more. The high modulus of elasticity provides a good protection of the inner sealing sheath when the innermost of the pair of reinforcement layers is subjected to high pressure from the outermost of the pair of reinforcement layers.

In one embodiment the anti-creep layer is a wound single layer of fiber element(s), such a filament(s).

In one embodiment the anti-creep layer comprises a first layer of fiber element(s), such a filament(s) wound such that each winding contacts the adjacent winding when the pipe is in a straight and unloaded condition, and a second layer of fiber element(s), such a filament(s) wound such that each second layer winding is arranged in grooves provided by the first layer above the contact between the first layer windings. Thereby a very stable anti-creep layer is provided which will have a high anti-creep effect even if the unbonded flexible pipe is subjected to substantial bends.

In one embodiment the innermost reinforcement layer is placed directly upon the anti-creep layer. In order to allow the individual elongate armoring elements to move or slide to provide a high flexibility an anti-wear layer is in one embodiment arranged between the innermost reinforcement layer and the anti-creep layer.

In one embodiment the unbonded flexible pipe of the invention comprises no anti-creep layer between the inner sealing sheath and the innermost reinforcement layer. In this embodiment the innermost reinforcement layer may preferably be placed directly upon the inner sealing sheath or be placed upon a film layer, e.g. an anti-wear layer wound onto the inner sealing sheath.

In one embodiment the outermost reinforcement layer is placed directly upon the innermost reinforcement layer. In order to allow the individual elongate armoring elements to move or slide to provide a high flexibility an anti-wear layer is in one embodiment arranged between the innermost reinforcement layer and the outermost reinforcement layer.

In one embodiment the angle $\alpha$ of the innermost of the pair of reinforcement layers is in the interval $60°{\geq}\alpha{\geq}30°$, such as $55°{\geq}\alpha{\geq}35°$, such as $50°{\geq}\alpha{\geq}40°$.

In one embodiment the angle $\beta$ of the outermost of the pair of reinforcement layers is in the interval $40°{\geq}\beta{\geq}5°$, such as $35°{\geq}\beta{\geq}10°$, such as $30°{\geq}\beta{\geq}15°$, such as $25°{\geq}\beta{\geq}15°$.

The elongate armoring elements may in principle be any kind of elongate armoring elements e.g. such as any of the elongate armoring elements known from the prior art.

In one embodiment the elongate armoring elements comprise metal such as steel. The metal may preferably be encapsulated in polymer e.g. in the form of metal fibers.

In one embodiment the elongate armoring elements are free of any metal.

In one embodiment the elongate armoring elements comprise or consist of polymer and fibers.

The fibers in the elongate armoring elements may be or comprise short fibers, such as cut fibers, however it is preferred that the major part or preferably substantially all of the fibers are continuous fiber elements more preferably selected from, filaments, strands, or rovings.

In one embodiment the fibers of the elongate armoring elements comprises or consists of one or more substantially continuous filaments, preferably with a thickness of about 5 µm or more, more preferably with a thickness of about 10 µm or more.

The fibers of the fibers of the elongate armoring elements may preferably comprise basalt fibers, aramid fibers, carbon fibers, glass fibers or any mixtures thereof.

In one embodiment the fibers of the elongate armoring elements are predominantly oriented along the length axis of the elongate armoring elements. Preferably about 50% by weight or more, such as about 75% by weight or more, such as about 90% by weight or more or even essentially all of the fibers are oriented along the length axis of the elongate armoring elements.

In one embodiment the fiber reinforced polymer material of the wound elongate armoring elements comprises fibers embedded in a thermoplastic material and/or in a thermoset material. The wound elongate armoring elements are in one embodiment provided by pultrusion and/or by lamination of two or more fiber reinforced polymer layers.

Examples of such elongate armoring elements can be found in U.S. Pat. No. 6,165,586, WO 01/51839, U.S. Pat. No. 6,872,343, US 2010/0101675, US 2010/0146768, US 2004/0175523, U.S. Pat. No. 6,620,471 and Danish copending applications PA 2010 01108 and PA 2011 00334.

In one embodiment the fiber reinforced polymer material of the wound elongate armoring elements comprises fibers sandwiched between polymer layers. Such elongate armoring elements are for example described in Danish copending applications PA 2011 00334 and in US 2010/0101675.

The elongate armoring elements of the innermost reinforcement layer respectively the elongate armoring elements of the outermost reinforcement layer may be similar to or different from each other. In one embodiment the innermost reinforcement layer comprises a plurality of substantially identical elongate armoring elements. In one embodiment the outermost reinforcement layer comprises a plurality of substantially identical elongate armoring elements. The term "substantially identical" as used herein include what are normally within ordinary production tolerances are included.

In one embodiment the elongate armoring elements of the innermost reinforcement layer are substantially identical to the elongate armoring elements of the outermost reinforcement layer.

In one embodiment the elongate armoring elements of the innermost reinforcement layer have a tensile strength which is between about 30% and 120% of the tensile strength of the elongate armoring elements of the outermost reinforcement layer.

In one embodiment the elongate armoring elements of the innermost reinforcement layer have a tensile strength which is between about 80% and 120% of the tensile strength of the elongate armoring elements of the outermost reinforcement layer.

In one embodiment the elongate armoring elements of the innermost reinforcement layer have a tensile strength which is between about 50% and 80% of the tensile strength of the elongate armoring elements of the outermost reinforcement layer.

It has been found that the elongate armoring elements of the outermost reinforcement layer generally will be subjected to a higher tensile load than the elongate armoring elements of the innermost reinforcement layer and therefore it is beneficial to select the elongate armoring elements of the outermost reinforcement layer to have a higher tensile strength than the elongate armoring elements of the innermost reinforcement layer.

In one embodiment where the unbonded flexible pipe of the invention comprises an anti-creep layer, the thickness of at least one of the innermost reinforcement layer and outermost reinforcement layer is larger than the thickness of the anti-creep layer, such as at least about 1.5 times thicker, such as at least about 2 times thicker, such as at least about 3 times thicker, such as at least about 4 times thicker, such as at least about 5 times thicker than the anti-creep layer.

In one embodiment the elongate armoring elements of the outermost reinforcement layer are thicker than the elongate armoring elements of the innermost reinforcement layer, such as from about 5 to about 100% thicker, such as from about 10% to about 90% thicker, such as from about 20% to about 80% thicker, such as from about 30% to about 70% thicker than the elongate armoring elements of the innermost reinforcement layers.

In most cases where the unbonded flexible pipe of the invention comprises an anti-creep layer, the thickness of the anti-creep layer need not be as large as the thickness of the innermost reinforcement layer and the thickness of the outermost reinforcement layer. In particular where the anti-creep layer comprises or consists of one or more substantially continuous fiber elements wound around the inner sealing sheath, the anti-creep layer can be relatively thin compared to the thickness of the innermost reinforcement layer and the outermost reinforcement layer, and accordingly this can add to keep the total weight of the unbonded flexible pipe relatively low while simultaneously having a anti-creep layer to protect the inner sealing sheath.

In one embodiment the pipe is free of metal on the outer side of the inner sealing sheath. This feature can also add to keep the total weight of the unbonded flexible pipe relatively low, also seen in the light that an outer sealing sheath for protecting metals against sea water can be omitted or replaced with a simple mechanical protecting layer without resulting in any undesired negative effects.

The individual layers of the unbonded flexible pipe may vary along the length of the pipe e.g. stepwise or continuously for example with respect to thickness, tensile strength and/or flexibility.

In one embodiment the one or more of the wound elongate armoring elements of the innermost reinforcement layer have a tensile strength which is higher in a first length section of the pipe than in a second length section of the pipe. In one embodiment the wound elongate armoring elements of the innermost reinforcement layer have a higher concentration of fibers, comprise different fibers or composition of fibers and/or have a higher radial thickness in the first length section of the pipe than in the second length section of the pipe.

In one embodiment one or more of the wound elongate armoring elements of the outermost reinforcement layer have a tensile strength which is higher in a first length section of the pipe than in a second length section of the pipe. In one embodiment the wound elongate armoring elements of the outermost reinforcement layer have a higher concentration of fibers, comprise different fibers or composition of fibers and/or have a higher redial thickness in the first length section of the pipe than in the second length section of the pipe.

The beneficial properties achieved by the unbonded flexible pipe of this invention are in particular useful in situations where the pipe is a riser. In one embodiment the pipe is a riser and one or more of the wound elongate armoring elements of at least one of the innermost reinforcement layer and the outermost reinforcement layer have a tensile strength which is higher in a first length section than in a second length section of the riser wherein the first length section is adapted to be arranged closer to a sea surface than the second length section.

In one embodiment at least about 80% of the fiber of the pipe is contained in the pair of reinforcement layers.

In one embodiment at least about 90% of the fiber of the pipe is contained in the pair of reinforcement layers.

In one embodiment the weight of the pair of reinforcement layers of a section of the pipe constitutes about 50% or less of the total weight of the section of the pipe.

In one embodiment the weight of the pair of reinforcement layers of a section of the pipe constitutes about 30% or less of the total weight of the section of the pipe.

In one embodiment the pair of reinforcement layers is not sealed against intrusion of sea water when in use.

In one embodiment where the pipe comprises an anti-creep layer, at least about 80% of the fiber of the pipe is contained in the anti-creep layer and the pair of reinforcement layers.

In one embodiment where the pipe comprises an anti-creep layer, at least about 90% of the fiber of the pipe is contained in the anti-creep layer and the pair of reinforcement layers.

In one embodiment where the pipe comprises an anti-creep layer, the weight of the anti-creep layer and the pair of reinforcement layers of a section of the pipe constitutes about 50% or less of the total weight of the section of the pipe.

In one embodiment where the pipe comprises an anti-creep layer, the weight of the anti-creep layer and the pair of reinforcement layers of a section of the pipe constitutes about 30% or less of the total weight of the section of the pipe.

In one embodiment where the pipe comprises an anti-creep layer, the anti-creep layer and the pair of reinforcement layers are not sealed against intrusion of sea water when in use.

In one embodiment the pipe comprises a mechanical protection layer arranged outside the outermost of the pair of reinforcement layers. The protection layer is in one embodiment an extruded and perforated polymer layer. The protection layer is in one embodiment a wound or folded polymer layer. The protection layer is in one embodiment a wound or braided layer of fiber elements e.g. the fiber elements as described above.

The protection layer need not cover the whole length of the pipe, but is in one embodiment arranged such that it covers about 50% of the length or more.

In one embodiment the thickness of the protection layer varies along the length of the pipe.

In one embodiment the pipe comprises alternating high thickness protection layer sections and low thickness protection layer sections, where the protection layer of the high thickness protection layer sections has a color which is different from the color of the protection layer of the low thickness protection layer sections. Thereby the load applied to the pipe during deployment of the pipe can be mainly placed at the high thickness protection layer sections.

In one embodiment the carcass comprises or consists of metal, such as steel or aluminum.

In one embodiment the carcass comprises ring elements, shell elements and/or wound elements, such as wound profiles and or folded strips, such as generally known in the art.

For providing that the pipe of the invention can be used offshore in oil production it is generally desired that the inner sealing sheath is a polymer based inner sealing sheath and has a thickness of at least about 4 mm in order to withstand pressure from fluids in the bore as well as hydrostatic pressure in use.

The inner sealing sheath may for example comprise polyolefins, e.g. polyethylene optionally cross linked (PEX) and poly propylene; polyamide, e.g. poly amide-imide, polyamide-11 (PA-11), polyamide-12 (PA-12) and polyamide-6 (PA-6)); polyimide (PI); polyurethanes; polyureas and combinations thereof. Other materials, such as the materials known in the art for this application may also be applied.

The unbonded flexible pipe of the invention may additionally comprise one or more monitoring sensors, such as it is known in the art e.g. at least one optical sensor for example as described in any one of U.S. Pat. No. 7,024,941, WO 2008077410, WO 2009106078 and DK PA 2009 01086.

Further more the unbonded flexible pipe of the invention may comprise one or more insulations layers, such as the insulation layers known from prior art.

BRIEF DESCRIPTION OF DRAWINGS

The invention will be explained more fully below in connection with a preferred embodiment and with reference to the drawings in which:

FIG. 4 shows an offshore system comprising a pipe of the invention in the form of a riser where the riser has sections with different tensile strength e.g. due to variations in thickness or other properties of one or more layers thereof.

FIG. 5 shows an offshore system comprising a pipe of the invention in the form of a riser where the pipe comprises alternating high thickness protection layer sections and low thickness protection layer sections.

The figures are schematic and may be simplified for clarity. Throughout, the same reference numerals are used for identical or corresponding parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
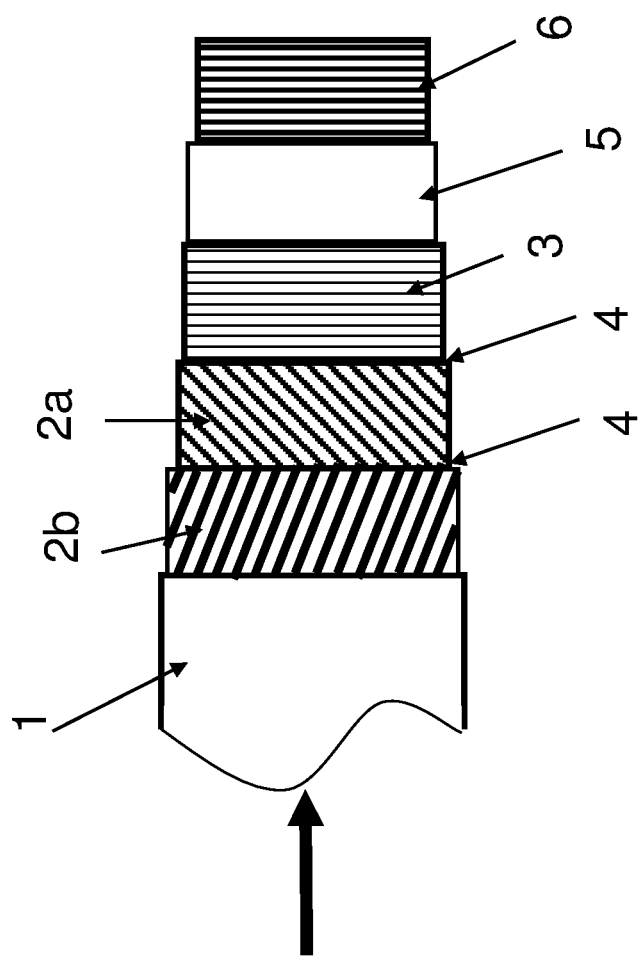
FIG. 1 shows a schematically side view of a flexible unbonded pipe of the invention where parts of the individual layers are removed to show the individual layers.

FIG. 1 shows a schematic side view of a first flexible unbonded pipe of the invention. The flexible unbonded pipe comprises from inside out a carcass 6, an internal sealing sheath 5, an anti-creep layer 3 placed in direct contact with the inner sealing sheath 5, an innermost reinforcement layer 2a, an outermost reinforcement layer 2b and an outer sheath 1, which in this embodiment is an extruded polymer layer and is substantially impermeable to liquid.

Between the anti-creep layer 3 and the innermost reinforcement layer 2a as well as between the innermost reinforcement layer 2a and the outermost reinforcement layer 2b, anti-wear layers indicated with reference number 4 may be arranged to protect the respective layers from wear, and to allow the individual elongate armoring elements to move with respect to each other.

The respective layers may be as described above. In one embodiment the carcass 6 is of metal, the anti-creep layer is of wound fiber elements e.g. filaments. The anti-creep layer is wound with an angle γ. The elongate armoring elements of the innermost reinforcement layer are wound with an angle α about 65° or less, and the elongate armoring elements of the outermost reinforcement layer are wound with an angle β where $\alpha \geq \beta * \pi/2$.

Preferably γ>α and is wound with the same winding direction as the elongate armoring elements of the outermost reinforcement layer.

| Examples of γ α and β of the pipe are as follows: | γ (degrees to centre axis) | α (degrees to centre axis) | B (degrees to centre axis) |
|---|---|---|---|
| Example A | 75° | 65° | 40° |
| Example B | 75° | 65° | 10° |
| Example C | 85° | 55° | 30° |
| Example D | 80° | 50° | 20° |
| Example E | 60° | 45° | 10° |
| Example F | 55° | 30° | 5° |

Figure 2:
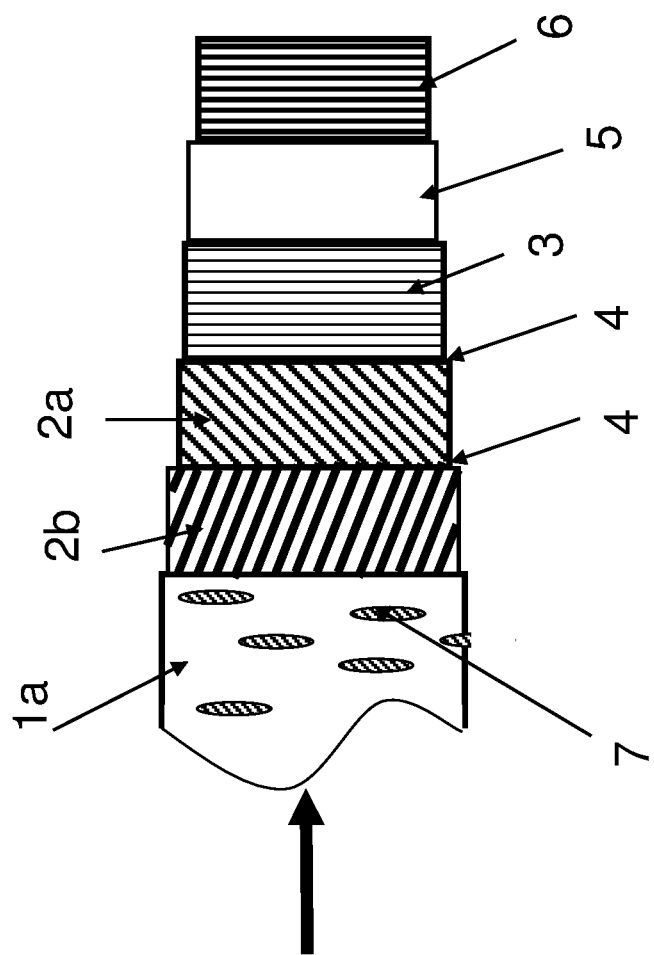
FIG. 2 shows a schematically side view of a second embodiment of a flexible unbonded pipe of the invention where parts of the individual layers are removed to show the individual layers.

FIG. 2 shows a schematic side view of a second flexible unbonded pipe of the invention. The second unbonded flexible pipe of the invention differs from the pipe shown in FIG. 1, in that the outer sheath 1a is an extruded polymer layer which is perforated with the perforations 7 such that the outer sheath is an outer mechanical protection layer which is permeable to liquid.

Figure 3:
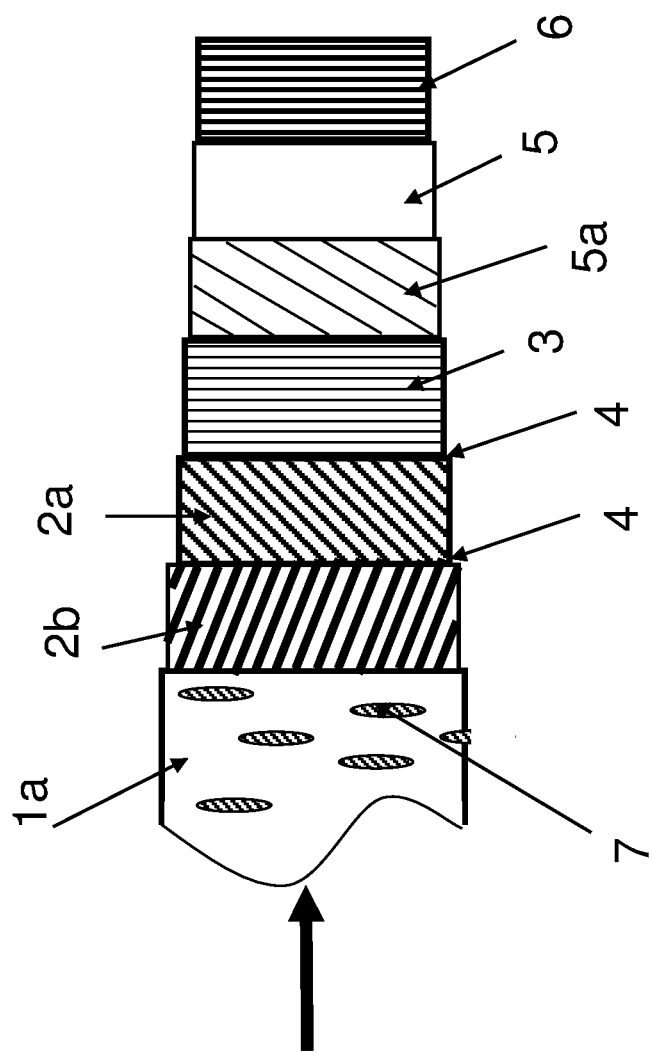
FIG. 3 shows a schematically side view of a third embodiment of a flexible unbonded pipe of the invention where parts of the individual layers are removed to show the individual layers.

FIG. 3 shows a schematic side view of a third flexible unbonded pipe of the invention. The third unbonded flexible pipe of the invention differs from the pipe shown in FIG. 2, in that the pipe comprises a wound film layer 5a which is wound onto the inner sealing sheath 5 and the anti-creep layer 3 is placed in direct contact with the wound film layer 5a.

FIG. 4 shows an offshore system comprising an unbonded flexible pipe 12 of the invention. The dotted line 10 indicates the sea surface. The offshore system further comprises a sea surface installation 11, such as a ship or a platform. The flexible pipe 12 is a riser arranged to transport liquid between the sea surface installation 11 and a not shown installation at a certain depth of water e.g. near the seabed (not shown). The flexible pipe 12 is for example a pipe as shown in FIG. 1, FIG. 2 or FIG. 3 as described above. The weight of the flexible unbonded pipe 12 provides a pulling force holding the pipe in tension. Due to the specific selection of winding angle of the pair of reinforcement layers the tensioning in the length direction of the pipe provides a high pressure force (a squeezing pressure) from the outermost of the pair of reinforcement layers 2b to the innermost of the pair of reinforcement layers 2a, thereby increasing the burst resistance while simultaneously providing a high tensile resistance.

The flexible unbonded pipe 12 has a first section 13, a second section 14 and a third section 15 where the tensile strength of the elongate armoring elements of the outermost and/or the innermost of the pair of reinforcement layers 2a, 2b is higher in the first section 13 than in the second section 14 and higher in the second section 14 than in the third section 15. In other words, the higher the section is arranged in the water the higher is the tensile strength of the outermost and/or the innermost of the pair of reinforcement layers 2a, 2b.

FIG. 5 shows an offshore system comprising a pipe 22 of the invention. The dotted line 20 indicates the sea surface. The offshore system further comprises a sea surface installation 21, such as a ship or a platform. The flexible pipe 22 is a riser arranged to transport liquid between the sea surface installation 21 and a not shown installation at a certain depth of water e.g. near the seabed (not shown). The flexible pipe 22 is for example a pipe as shown in FIG. 2 or FIG. 3 as described above where the pipe comprises alternating high thickness protection layer sections 25 and low thickness protection layer sections 23. The protection layer of the high thickness protection layer sections 25 preferably has a color which is different from the color of the protection layer of the low thickness protection layer sections 23. The protection layer of the high thickness protection layer sections 25 may for example be from about 1.5 times to about 50 times, such as from about 2 times to about 20 times the thickness of the low thickness protection layer sections 23.

Some preferred embodiments have been shown in the foregoing, but it should be stressed that the invention is not limited to these, but may be embodied in other ways within the subject-matter defined in the following claims.

What is claimed is:

1. A flexible unbonded pipe for sub sea fluid transfer, the pipe comprises an inner sealing sheath defining a bore and a centre axis, inside the inner sealing sheath the pipe comprises a carcass, the pipe further comprises a pair of reinforcement layers consisting essentially of helically wound elongate armoring elements of fiber reinforced polymer material, wherein the elongate armoring elements of the innermost of the pair of reinforcement layers are wound in a first winding direction with an angle $\alpha$ to the centre axis, the elongate armoring elements of the outermost of the pair of reinforcement layers are wound in a second winding direction with an angle $\beta$ to the centre axis, wherein $\alpha \geq \beta * \pi/2$, $\alpha$ is about 65° or less, and the pair of reinforcement layers are placed directly upon the inner sealing sheath or with at least one of an anti-wear layer and an anti-creep layer in between the innermost of the pair of reinforcement layers and the inner sealing sheath, wherein the pipe is free of metal on the outer side of the inner sealing sheath.

2. The flexible unbonded pipe as claimed in claim 1 wherein the anti-creep layer is a wound layer, preferably comprising one or more tapes and/or one or more fibers.

3. The flexible unbonded pipe as claimed in claim 2, wherein the anti-creep layer is a wound layer and has a lay angle $\gamma$ to the centre axis, wherein $\gamma > \alpha$ and $\gamma \geq 55°$.

4. The flexible unbonded pipe as claimed in claim 1, wherein the anti-creep layer comprises or consists of one or more substantially continuous fiber elements selected from basalt fibers, aramid fibers, carbon fibers, glass fibers or any mixtures thereof.

5. The flexible unbonded pipe as claimed in claim 4, wherein the one or more substantially continuous fiber elements each have a modulus of elasticity in their length direction of about 30,000 MPa or more.

6. The flexible unbonded pipe as claimed in claim 1, wherein the anti-creep layer substantially covers the inner sealing sheath when the pipe is in a straight and unloaded condition.

7. The flexible unbonded pipe as claimed in claim 1, wherein the anti-creep layer is a wound layer, wound in the second winding direction with a winding direction of at least about 60°.

8. The flexible unbonded pipe as claimed in claim 1, wherein the innermost of the pair of reinforcement layers is placed directly upon the anti-creep layer.

9. The flexible unbonded pipe as claimed in claim 1, wherein the outermost of the pair of reinforcement layers is placed directly upon the innermost of the pair of reinforcement layers, optionally with an anti-wear layer in between the outermost of the pair of reinforcement layers and the innermost of the pair of reinforcement layers.

10. The flexible unbonded pipe as claimed in claim 1, wherein the angle $\alpha$ of the innermost of the pair of reinforcement layers is in the interval $60° \geq \alpha \geq 30°$.

11. The flexible unbonded pipe as claimed in claim 1, wherein the angle $\beta$ of the outermost of the pair of reinforcement layers is in the interval $40° \geq \beta \geq 5°$.

12. The flexible unbonded pipe as claimed in claim 1, wherein the fiber reinforced polymer material of the wound elongate armoring elements comprises fibers embedded in a thermoplastic material and/or in a thermoset material.

13. The flexible unbonded pipe as claimed in claim 1, wherein the fiber reinforced polymer material of the wound elongate armoring elements comprises fibers sandwiched between polymer layers.

14. The flexible unbonded pipe as claimed in claim 1, wherein the wound elongate armoring elements of the innermost of the pair of reinforcement layers have a tensile strength which is between about 80% and 120% of the tensile strength of the elongate armoring elements of the outermost of the pair of reinforcement layers.

15. The flexible unbonded pipe as claimed in claim 1, wherein the thickness of at least one of the innermost of the pair of reinforcement layers and the outermost of the pair of reinforcement layers is at least about 2 times larger than the thickness of the anti-creep layer.

16. The flexible unbonded pipe as claimed claim 1, wherein the elongate armoring elements of the outermost of the pair of reinforcement layers are thicker than the elongate armoring elements of the innermost of the pair of reinforcement layers.

17. The flexible unbonded pipe as claimed in claim 1, wherein one or more of the wound elongate armoring elements of the innermost of the pair of reinforcement layers have a tensile strength which is higher in a first length section of the pipe than in a second length section of the pipe.

18. The flexible unbonded pipe as claimed in claim 1, wherein the pipe is a riser.

19. The flexible unbonded pipe as claimed in claim 1, wherein the pipe comprises a mechanical protection layer arranged outside the outermost of the pair of reinforcement layers.

20. The flexible unbonded pipe as claimed in claim 1, wherein the carcass comprises or consists of metal.

21. A flexible unbonded pipe as claimed in claim 1, wherein the carcass comprises ring elements, shell elements and/or wound elements.

22. A flexible unbonded pipe as claimed in claim 1 wherein the inner sealing sheath is a polymer based inner sealing sheath and has a thickness of at least about 4 mm in order to withstand pressure of fluids in the bore and hydrostatic pressure in use.

* * * * *